United States Patent Office 2,951,099
Patented Aug. 30, 1960

2,951,099

1,4,5,6,7,7-HEXACHLORO-2,3-BIS(BROMOMETHYL)-BICYCLO(2.2.1)-HEPTADIENE-2,5

Paul E. Hoch, Youngstown, N.Y., assignor to Hooker Chemical Corporation, Niagara Falls, N.Y., a corporation of New York No Drawing. Filed Jan. 12, 1959, Ser. No. 786,027

3 Claims. (Cl. 260—648)

This invention relates to a new composition of matter and a method of preparing it. More specifically, this invention resides in the bromination of 1,4,5,6,7,7-hexachloro-2,3-dimethylene-bicyclo-(2.2.1)-heptene-5 (hereinafter referred to as HET diene) to form a new composition of matter 1,4,5,6,7,7-hexachloro-2,3-bis(bromomethyl)-bicyclo-(2.2.1)-heptadiene-2,5.

The reaction is as follows:

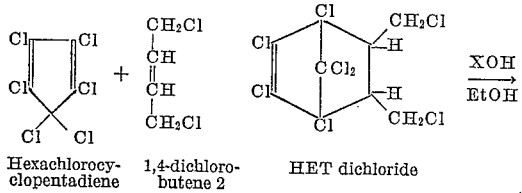

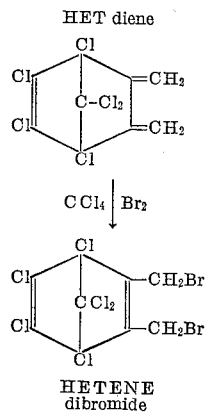

1,4-dichlorobutene was added to hexachlorocyclopentadiene to form 1,2,3,4,7,7-hexachloro-5,6-bischloromethylbicyclo-(2.2.1)-heptene-2 (HET dichloride). The HET dichloride was added to a potassium hydroxide ethanol solution to form 1,4,5,6,7,7-hexachloro-2,3-dimethylene-bicyclo-(2.2.1)-heptene-5 (HET diene). The HET diene was dissolved in carbon tetrachloride and brominated. The carbon tetrachloride was evaporated, leaving a crystalline solid which melted at 124.5–125 degrees centigrade and identified as 1,4,5,6,7,7-hexachloro-2,3-bis(bromomethyl)-bicyclo-(2.2.1)-heptadiene-2,5.

The product of this invention has utility as a chemical intermediate, and as a flameproofing agent. The HETENE dibromide is more fire-retardant than is the HET dichloride. It also should be mentioned that the qualitative reactivity of the HETENE dibromide is greater than the reactivity of the HET dichloride. Other uses will become apparent to those skilled in the art upon a reading of this disclosure.

The prior art teachings indicated that when unsaturated chlorinated compounds are added to hexachlorocyclopentadiene, product yields are relatively low. Unexpectedly, applicant has found in the addition of the dichlorobutene to hexachlorocyclopentadiene an extremely desirable yield of HET dichloride is obtained. This compound is then dehydrohalogenated with KOH in an alcohol solution to form HET diene. HET diene is disclosed and claimed in copending application S.N. 757,187, filed August 26, 1958; and may be prepared by the dehydrohalogenation of 1,4,5,6,7,7-hexachloro - 2,3 - dichloromethylbicyclo-(2.2.1)-heptene-5 (HET dichloride). In the preferred procedure HET dichloride is heated in an ethanol solution of potassium hydroxide at a temperature between about 20 and 100 degrees centigrade. It was further unexpected when the HET diene was brominated that the high yield of HETENE dibromide would result, and that the bromine addition so occurring would result.

In the dehydrohalogenation of HET dichloride to HET diene a solvent should be employed. Ethanol or methanol are preferred; however, others for example, dioxane, n-butanol, butyl cellosolve, methyl cellosolve, diethyl carbitol, tertiary butyl alcohol, normal amyl alcohol, and tertiary amyl alcohol may be used. It is important that this solvent employed be inert with respect to the reactants and reaction products and should have a sufficiently high boiling point to allow for reaction at elevated temperatures without necessitating the application of superatmospheric pressure. The time allowed for reaction will vary with the purity of the reactants, the degree of completion of reaction desired, the solvents employed, etc. Ordinary purification procedures known in the art such as washing, absorbent decolorization, recrystallization, etc., may be satisfactorily employed.

The following examples illustrate and are not to be considered as limiting the scope of this invention.

*Example I*

The 1,4,5,6,7,7-hexachloro-2,3-bis(bromomethyl)-bicyclo-(2.2.1)-heptadiene-2,5 (HETENE dibromide) of this invention is made as follows:

Six grams of HET diene (0.02 mole) were dissolved in 30 cc. carbon tetrachloride and 2.96 grams of bromine were added. An exothermic reaction took place. After three minutes the carbon tetrachloride was evaporated. The crystalline solid recrystallized, M.P. 124.5–125° C. Percent C, theory 22.3. Percent C, found 22.3.

*Example II*

A solution of 32.5 grams of HETENE dibromide in 100 cc. of ethanol was treated with 6.5 grams of powdered zinc metal. This suspension was stirred at reflux for one and one-half hours. The reaction mixture was filtered. The filtrate upon evaporation yielded a polymer. The polymer was fire-retardant.

*Example III*

Five grams of the product obtained in Example I were dissolved in 10 grams of a copolymerizable composition consisting of 44 percent styrene, and 56 percent of a polyester consisting of 1 mol of phthalic anhydride, 1 mol of fumaric acid and 2 mols of ethylene glycol. One percent of benzene peroxide was added as a polymerization catalyst. The resulting mixture was placed in a circulating oven at 80 degrees centigrade for about eighteen hours. A clear resin was obtained which was self-extinguishing when ignited.

The examples of the compositions of my invention, and methods of preparing and utilizing them which have been described in the foregoing specification, have been given for purposes of illustration, not limitation. Many other modifications and ramifications will naturally suggest themselves to those skilled in the art, based on the disclosure of my basic discovery. Theseare intended to be comprehended within the scope of my invention.

I claim:
1. The process of producing 1,4,5,6,7,7-hexachloro-2,3-bis(bromomethyl)-bicyclo - (2.2.1) - heptadiene-2,5 which comprises adding bromine to 1,4,5,6,7,7-hexachloro-2,3-dimethylene-bicyclo-(2.2.1)-heptene-5.

2. The process of producing 1,4,5,6,7,7-hexachloro-2,3-bis(bromomethyl)-bicyclo - (2.2.1) - heptadiene-2,5 which comprises dissolving 1,4,5,6,7,7-hexachloro-2,3-dimethylene-bicyclo-(2.2.1)-heptene-5 in carbon tetrachloride, adding bromine to resulting solution, evaporating off the carbon tetrachloride, and recovering the product formed.

3. 1,4,5,6,7,7-hexachloro - 2,3 - bis(bromomethyl)-bicyclo-(2.2.1)-heptadiene-2,5.

References Cited in the file of this patent
UNITED STATES PATENTS

| | | |
|---|---|---|
| 2,717,851 | Lidov | Sept. 12, 1955 |
| 2,905,725 | Schmerling | Sept. 22, 1959 |

OTHER REFERENCES

Fields: J. Am. Chem. Soc. 76 2709–10 (1954).

Migrdichian: Organic Synthesis, vol. I, Reinhold Pub. Co. (1957), page 513.